United States Patent [19]

Dansereau

[11] 4,203,762

[45] May 20, 1980

[54] PROCESS FOR SEPARATING AND RECOVERING ALUMINUM AND STEEL FROM BIMETAL SCRAP

[75] Inventor: John L. Dansereau, Ann Arbor, Mich.

[73] Assignee: Federal-Mogul Corporation, Southfield, Mich.

[21] Appl. No.: 968,194

[22] Filed: Dec. 11, 1978

[51] Int. Cl.² ............................................. C22B 21/00
[52] U.S. Cl. ................................... 75/68 R; 75/44 S; 75/63
[58] Field of Search ................. 75/44 S, 63, 65, 68 R

[56] References Cited

U.S. PATENT DOCUMENTS

| 902,581 | 11/1908 | Higgins | 75/64 |
| 1,938,239 | 12/1933 | White | 266/205 |
| 2,154,673 | 4/1939 | Fleck et al. | 75/63 |
| 2,704,249 | 3/1955 | Mushovic | 75/68 R |
| 3,501,292 | 3/1970 | Hart | 75/72 |
| 3,539,163 | 11/1970 | Mitchell | 75/63 |
| 3,556,500 | 1/1971 | Fritz | 75/63 |

Primary Examiner—M. J. Andrews
Attorney, Agent, or Firm—Harness, Dickey & Pierce

[57] ABSTRACT

A process for separating and recovering aluminum lining from a ferrous backing strip without incurring appreciable formation of contaminating iron-aluminum intermetallic compounds by subjecting bimetallic scrap to intense radiant heat to effect rapid heating thereof through the critical temperature range of about 842° F. to above the melting point of the aluminum component and removing the liquid aluminum as it melts.

10 Claims, 7 Drawing Figures

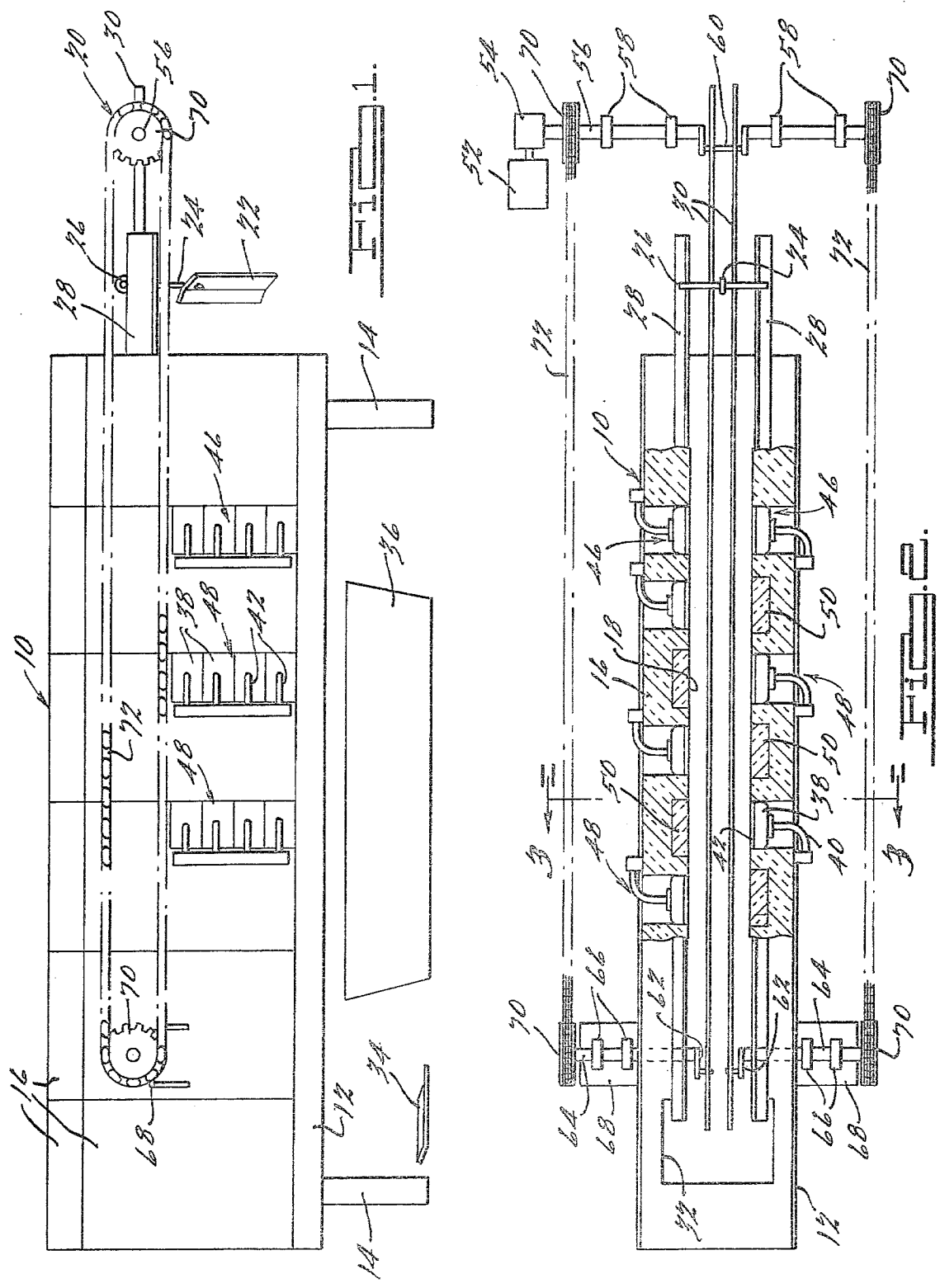

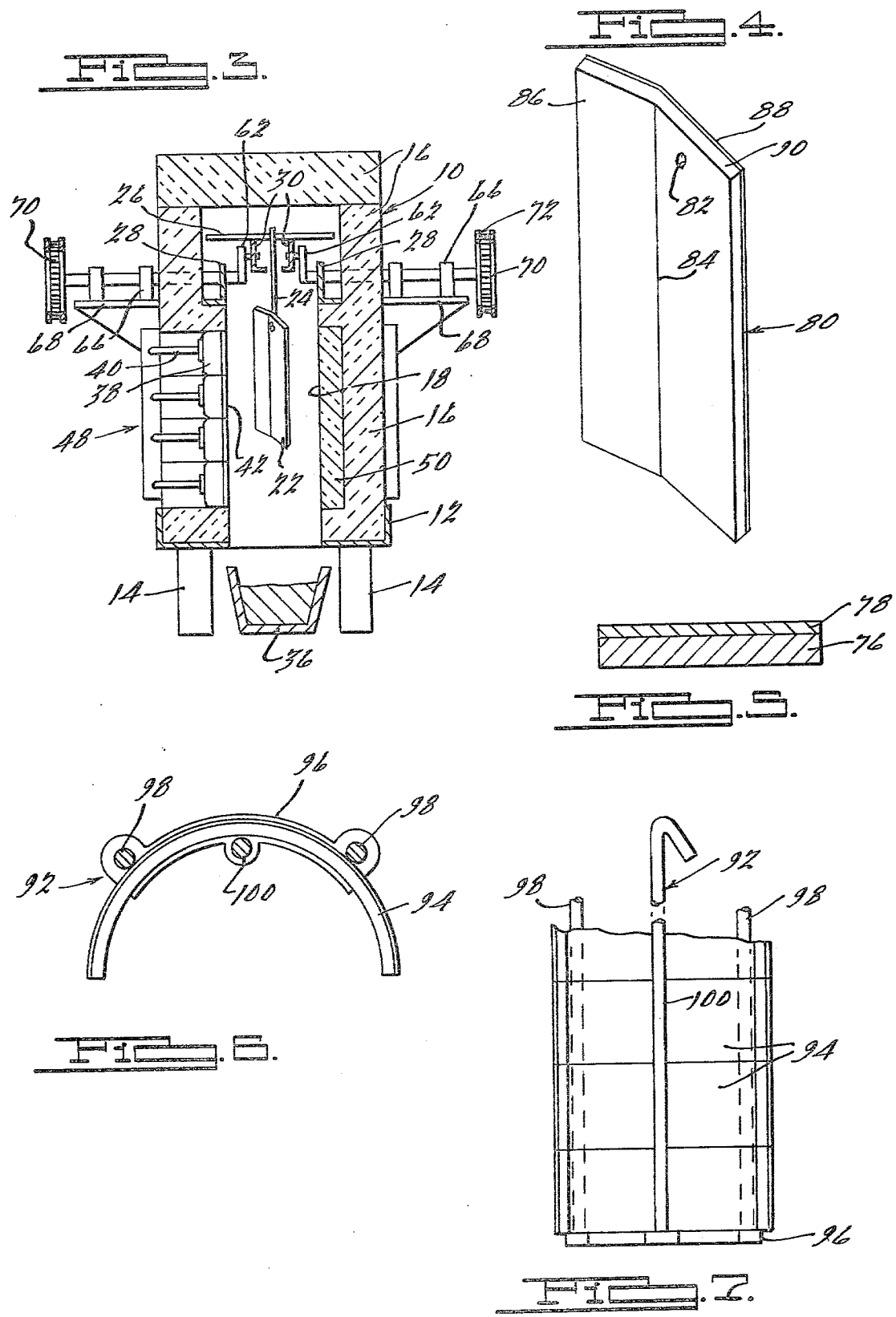

PROCESS FOR SEPARATING AND RECOVERING ALUMINUM AND STEEL FROM BIMETAL SCRAP

BACKGROUND OF THE INVENTION

The present invention is broadly applicable for processing aluminum clad ferrous substrates to separately recover the aluminum and ferrous components in reusable form. The present invention is particularly applicable, but not necessarily restricted to the processing of bimetal scrap generated in the manufacture of sleeve or shell-type bearings comprising an aluminum or aluminum alloy lining tenaciously bonded to a steel backing strip. Shell-type bearings of the forgoing type and methods for their manufacture are disclosed in the U.S. Pat. Nos. 3,078,563; 3,221,392; 3,732,083 and 3,955,936 which are assigned to the same assignee as the present invention.

In accordance with the typical methods disclosed in the aforementioned patents, an aluminum or selected aluminum alloy is bonded to a hard metal backing strip such as steel by roll-bonding a strip of aluminum to the steel backing or alternatively, by sintering an aluminum alloy in the form of powder particles on a steel backing strip. In either event, the bimetal strip is produced in great lengths in a continuous manner. Usually, the leading end portion and trailing end portion of the bimetallic strip are not up to specification necessitating a discarding thereof. In a roll-bonding operation for example, it is usually necessary to make some adjustments to the roll spacing during the initial run of the strip to achieve adequate bonding and the lead end portion during the process adjustment phase is below optimum standards and is discarded as scrap. The precision and high standards required for such shell-type bearings in some instances requires other portions of the bimetal strip to be relegated to scrap. A continuing problem associated with the manufacture of such bimetallic aluminum-steel bearing materials has been the inability to economically recover the aluminum and steel constituents separately which has detracted from the efficiency and economics in the manufacture of such bearing materials. This problem has been further aggravated by the increased costs of certain of the alloying constituents employed in the aluminum bearing lining including for example, tin, nickel, manganese and the like.

In recognition of this problem, various methods have heretofore been used or proposed for recovering and separating the aluminum and steel backing strip from such bimetallic scrap. For example, a mechanical separation technique as disclosed in British Pat. No. 1,462,751 relying on differential thermal expansion between the aluminum and steel layers has been found commercially inadequate in effecting an economical and efficient separation of the two constituents. Chemical dissociation and electro-deposition techniques, while satisfactory from the standpoint of effecting a relatively pure separation, are far too costly on a commercial basis. The use of a selective melting technique employing a molten salt bath has also been found unsuitable because the aluminum constituents recovered contain substantial iron contamination in amounts of above 1% by weight. Ordinarily, iron is permissible in aluminum for salvage purposes up to a maximum of 0.4% by weight.

The present invention overcomes the problems and disadvantages associated with prior art salvaging techniques of aluminum-steel bimetal scrap by providing an efficient, economical and simple method for separately recovering the aluminum and steel constituents on a commercial scale. In addition, the present method enables recovery of reusable aluminum or aluminum alloy material from such scrap at a substantial energy savings of up to about 90% in comparison to that required to replace the recovered aluminum scrap with primary metals.

SUMMARY OF THE INVENTION

The benefits and advantages of the present invention are achieved by a scrap recovery technique in which no appreciable amount of contaminating iron-aluminum intermetallic compounds are formed by introducing the bimetallic scrap into a furnace chamber in which the scrap is rapidly heated by radiant energy through a critical temperature range commencing at about 842° F. to a temperature above the melting point of the aluminum lining to quickly convert the aluminum to a liquid phase. The molten aluminum is quickly removed from the surfaces of the ferrous substrate before any appreciable reaction can occur between the aluminum and iron to form detrimental iron-aluminum intermetallic compounds. In accordance with a preferred practice of the present invention, the scrap is first treated to apply a dark surface coating thereby increasing the subsequent rate of radiant heat absorption. The heating of the aluminum lining through the critical range then takes place in as little as two seconds up to about 20 seconds.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a side elevational view of a furnace arrangement suitable for use in the practice of the present invention;

FIG. 2 is a plan view of the furnace shown in FIG. 1 with the upper refractory layer removed to expose the interior arrangement thereof;

FIG. 3 is an enlarged transverse vertical sectional view of the furnace shown in FIG. 2 and taken substantially along the line 3—3 thereof;

FIG. 4 is an enlarged perspective view of a typical piece of bimetallic scrap prepared for processing through the furnace arrangement;

FIG. 5 is a magnified transverse cross sectional view of a typical bimetal scrap material;

FIG. 6 is a sectional view of a rack for supporting bimetal scrap in the form of semi-cylindrical shell-bearings; and FIG. 7 is a fragmentary elevational view of the rack shown in FIG. 6.

DESCRIPTION OF THE PREFERRED EMBODIMENTS

Referring now in detail to the drawings, and as may be best seen in FIGS. 1-3, a furnace 10 is illustrated comprising a framework or base 12 including supporting legs 14 on which a plurality of refractory insulating blocks 16 are mounted defining an internal furnace chamber 18. The furnace chamber 18 is of a generally T-shaped cross section as best seen in FIG. 3 and is open along its lower end to permit discharge of the recovered molten aluminum and the residual ferrous scrap. The chamber is also open at its inlet or right hand end as viewed in FIGS. 1 and 2 to enable conveyance of scrap through the chamber in a direction toward the left by a walking beam type conveying system indicated at 20. In the examplary embodiment shown in FIGS. 1-3, a piece of bimetallic scrap 22 is supported on a double ended hook 24 connected at its upper end to a cross-bar or rod 26 which extends transversely with respect to the direction of travel and is alternatively supported on a pair of stationary support rails 28 and walking beams 30.

The furnace chamber 18 can be conveniently subdivided into longitudinal sections including a preheat zone along the inlet end portion thereof, a melt zone and a discharge zone at the outlet end thereof. The discharge zone as best seen in FIG. 2 is defined by an enlarged vertical section 32 in the furnace chamber through which the hook 24, supporting rod 26 and stripped ferrous scrap indicated at 34 in FIG. 1 are discharged from the furnace. A mold or crucible 36 is disposed longitudinally beneath the melt zone of the furnace into which the molten aluminum or aluminum alloy is gravitationally discharged and can subsequently be recovered in the form of a solidified ingot.

The furnace chamber 18 is equipped with radiant-type heaters of any of the various versions commercially available which are able to subject the bimetallic scrap to intense radiant heat effecting a rapid heating thereof through the critical temperature range. It has been observed, that above a threshold temperature of about 842° F., aluminum and iron react to form aluminum-iron intermetallic compounds. Such intermetallic compounds comprise a contaminant in the aluminum or aluminum alloy recovered resulting in significant concentrations of iron which as previously mentioned, renders the aluminum constituent unusable and of little salvage value when the iron concentration is above about 0.4% by weight. The reaction between the aluminum and iron increases as the temperature rises above about 842° F. and it is therefore important that the heating of the scrap from the threshold temperature to above the melting point of aluminum is performed as rapidly as possible and the liquid aluminum recovered immediately to minimize the formation of contaminating iron-aluminum intermetallic compounds. In order to achieve this objective, it is preferred in accordance with the furnace arrangement illustrated, to initially preheat the scrap to a temperature approaching but below the critical threshold temperature of 842° F. and to thereafter transfer the preheated scrap into the melt zone in which it is subjected to intense radiant heat to cause the scrap to be heated rapidly to a temperature above the melting point of the aluminum lining which is usually about 1200° F. or somewhat higher depending upon the specific aluminum alloy composition.

Radiant heaters suitable for providing intense radiant heat are gas burners employing an air and gaseous fuel of the type disclosed in the U.S. Pat. No. 3,445,175 which can achieve temperatures up to about 2600° F. In accordance with the burner construction disclosed in the aforementioned United States Patent, the substance of which is incorporated herein by reference, and as diagrammatically illustrated in FIG. 2 of the drawings, each burner 38 comprises a casing connected to a supply tube 40 for supplying a gas-air mixture to a burner head which is provided with an external incandescent plate 42 which may be of a ceramic or of a heat resisting metal, such as, for example, a chromium-nickel alloy or tungsten. The incandescent plate 42 is provided with small apertures through which the combustion products pass into the furnace chamber 18. In the specific arrangement as illustrated in FIGS. 1-3, the burners 38 are grouped in the form of modules in vertically stacked relationship at longitudinally spaced intervals along the furnace chamber to provide the requisite radiant heat distribution to the scrap during its travel through the preheat zone and melt zone of the furnace. It will be understood, that alternative radiant heaters or burners can be employed, including electric-type radiant heaters for effecting a rapid heating of the scrap.

As best seen in FIGS. 1 and 2, the preheat zone of the furnace includes a pair of preheat modules 46 disposed in opposed relationship for effecting a preheating of the entering scrap to a temperature approaching the threshold temperature of 842° F. The preheat modules 46 may be of an alternative burner design in that the level and rate of heating required are lower in this section of the furnace. The melt zone of the furnace incorporates burner modules 48 which are disposed in alternating staggered relationship and the furnace wall opposite each burner module 48 is provided with a heat sink 50 for reradiating the radiant heat directed there-against at such time that no scrap is interposed between the burner module and heat sink. The heat sink 50 may be made of any suitable heat resistant material such as graphite, clay-graphite, plate steel, or silicon carbide of which silicon carbide constitutes the preferred material because of its high specific heat and its ability to withstand high temperatures over extended time periods without deterioration. Each heat sink 50 is embedded within the heat insulating material of which the furnace wall is comprised along its side and rearward surface to minimize heat loss to the exterior of the furnace. In accordance with the forgoing arrangement, the scrap processed is subjected to a high intensity continuous radiant heat from the burner modules and the heat sinks in the course of their travel through the melt zone of the furnace chamber. In this connection, the opposed sidewalls of the furnace chamber are positioned as close as possible while still allowing unimpeded conveyance of the scrap being processed in order to maximize the intensity of the radiant heat to which the scrap is subjected. Since radiant energy is radiated in all directions from its source, the closer the proximity of the scrap to the face of the burner modules and heat sinks the greater the proportion of the radiant energy which will impinge on the scrap and the more rapid and efficient the heating of the scrap through the critical range.

As will be noted in FIG. 2, the burner modules 48 are exposed along with their rearward surfaces to maintain the supply tubes and associated valving as cool as possible to prevent pre-ignition and backfiring of the burner systems.

The staggered arrangement of the burner modules 48 in accordance with the specific arrangement illustrated in FIGS. 1-3 of the drawing is particularly applicable for processing individual scrap pieces conveyed at indefinite intervals through the furnace chamber. In such event, during time periods when no scrap is present, each burner module 48 effects a preheating of the heat sink 50 opposite thereto which in turn is raised in temperature by the heat absorbed approaching the temperature of the incandescent plate of the burner module itself. When a scrap piece is disposed between the burner module and heat sink, the heat sink itself becomes a reradianting body and also effectively heats the scrap by radiant dissipation of stored energy. On the other hand, when processing continuous bimetallic strips, the continuous nature of such scrap prevents any appreciable energy absorption by opposed heat sinks and it is preferred under such conditions to employ burner modules in the melt zone of the furnace which are positioned in opposed relationship similar to the heater modules 46 in the preheat zone.

The walking beam conveying system 20 is particularly applicable for intermittently conveying scrap pieces at optionally spaced intervals at variable speeds through the furnace chamber from the inlet end to the discharge end thereof. The conveying system includes a variable speed motor 52 connected to a gear box 54 having its output end connected to a line-shaft 56 journaled in bearings diagrammatically indicated at 58. The line-shaft 56 incorporates a crank arm 60 which is operatively connected to the right hand end of the walking beams 30 as viewed in FIGS. 1 and 2 to impart a rotary or oscillating movement thereto. The opposite end of each walking beam 30 is connected by means of a lever arm 62 affixed to the ends of sub-shafts 64 which extend inwardly through the furnace wall and are journaled in bearings 66 supported on platforms 68. Syncronization of the oscillating or rotary movement of the walking beams at each end is achieved by sprockets 70 affixed on the line-shaft and sub-shafts around which a continuous flexible element such as a roller chain 72 is trained. The cooperative components of the walking beam conveying system are arranged so that the supporting rods 26 on which the scrap pieces 22 are suspended by means of the hooks 24 are lifted by the walking beams to a position above the upper edges of the support rails and are advanced through an arcuate increment to a position downstream at which they are redeposited on the supporting rails. This incremental advancement is also accompanied by a jarring or vibration of the scrap pieces each time they are lifted and redeposited on the supporting rail which further facilitates dislodgement and gravitational drainage of the molten aluminum from the surface of the ferrous backing.

As shown in FIGS. 1 and 2, scrap pieces to be processed are positioned on the input end of the support rails 28 from which they are progressively advanced through the preheat zone, melt zone and finally to the discharge zone of the furnace. Upon attaining a position adjacent the discharge end of the support rails, the residual ferrous scrap including the hook 24 and support rod 26 pass beyond the end of the support rail and drop downwardly through the enlarged section 32 in which the residual ferrous scrap piece 34 as shown in FIG. 1 can be recovered along with the hook and supporting rod for reuse. The recovered ferrous or steel scrap processed in accordance with the present method is usually characterized as having only a very thin film of a residual iron-aluminum intermetallic compound thereover with a thin adherent aluminum oxide film thereover and comprises a commercially saleable scrap material.

It will be understood that while a walking beam type conveying system is illustrated in accordance with the preferred embodiment, alternative conveying systems can also be used in the practice of the present process. Such alternative systems include vibratory conveyers and chain-type conveyers or endless belts for conveying the scrap material through the furnace. However, because of the high temperature within the furnace chamber, walking beam type conveying systems are usually preferred.

In the practice of the process employing the furnace arrangement as hereinabove described, the scrap is subjected to intense radiant heat in the range of about 2250° to about 2600° F. or higher. Under such intense radiant heating, the bimetal scrap is heated through the critical temperature range of 842° F. to a temperature above the melting point of the aluminum or aluminum alloy lining which is about 1200° F. and the molten metal rapidly separates from the iron substrates in a matter of seconds. The rapid heating and melting of the aluminum components through the critical range proceeds so quickly that the reaction between the aluminum and iron to form intermetallic compounds is held to a minimum. Employing the furnace arrangement described utilizing radiant heat in the range of about 2250° F. to about 2600° F., a melting of the aluminum by heating through the critical temperature range takes place at a rate of approximately one second for each 0.002 inch of aluminum lining thickness. Accordingly, for aluminum linings which conventionally range in thickness from about 0.004 up to about 0.040 inch, time periods of about two seconds up to about 20 seconds are required to effect a melting and drainage of the aluminum constituent from the ferrous substrates. Under such rapid heating conditions, the aluminum or aluminum alloy recovered in the crucible contains iron in a range usually of only 0.005 up to about 0.030%. This relatively minimal contamination of iron renders the resultant alloy readily reusable since the maximum concentration of iron ordinarily allowed in the various aluminum alloys is 0.4% by weight.

Referring now to FIGS. 4-7 of the drawings, a typical magnified cross section of a bimetallic scrap is illustrated in FIG. 5. As shown, the bimetallic scrap comprises an iron or steel backing 76 to which an aluminum or aluminum alloy lining 78 is tenaciously bonded at the interface therebetween. In the manufacture of shell-type bearings, the ferrous backing 76 normally comprises a mild steel backing while the aluminum lining 78 comprises an aluminum alloy containing small amounts of various alloying constituents to enhance its corrosion and fatigure resistance and to further improve the durability of antifrictional characteristics thereof. Typical aluminum alloys employed for forming composite anti-friction materials are alloys containing 2.5% to 3.5% cadmium, 1% to 1.5% copper, 0.07% to 1.25% nickel, 1.25% to 1.75% manganese with the balance essentially aluminum. Another suitable aluminum alloy for bearing purposes includes 3.5% to 4.5% tin, 3.5% to 4.5% silicon, 0.7% to 1.3% copper with the balance essentially aluminum along with up to 0.5% iron and minimal contaminants including titanium, manganese, and magnesium. Aluminum lead alloys containing up to 10% lead have also been employed in the manufacture of such composite bearing materials. It will be understood, that the term "aluminum" as herein employed and as set forth in the subjoined claims includes substantially pure aluminum as well as aluminum alloys of the foregoing and other types.

When the bimetallic scrap is derived such as from the lead-in strip of a roll bonding operation which is of indefinite length, the scrap is first processed to place it in a condition in which it can more readily be handled through the furnace. Accordingly, such strip scrap is first subjected to a flattening operation and thereafter is cut into length which can be readily handled by the furnace. Additionally, the scrap is pierced with an aperture to enable attachment to a supporting hook and is bent longitudinally to effect a stiffening thereof and to prevent curling as a result of being subject to the intense radiant heat during the course of its travel through the furnace. A typical scrap piece 80 is illustrated in FIG. 4 having an aperture 82 in the upper end thereof and including a dihedral angle 84 extending longitudinally thereof to form an integral stiffening flange 86. As in the case of the bimetallic scrap shown in FIG. 5, the scrap 80 includes an aluminum lining 88 and a ferrous backing 90. It is relatively immaterial whether the aluminum lining 88 is on the inside of the dihedral angle or on the outside due to the intense radiant heat to which the scrap is subjected from both sides of the furnace chamber. The preparation of the scrap 80 in the configuration shown in FIG. 4 can readily be achieved in a single die punch operation.

When the bimetallic scrap is derived from partly processed semi-cylindrical shell-type bearings, a suitable supporting rack such as the rack 92 shown in FIGS. 6 and 7 can be employed for stacking the individual semi-cylindrical shells 94 in vertically spaced relationship. The rack 92 comprises a base 96 from which two vertical side rods 98 extend upwardly. A central supporting rod 100 is affixed to the base and is formed with an upper hook portion.

In accordance with the preferred practice of the present process, the conditioned scrap material is subjected to a pre-treatment in which the surfaces thereof are provided with a dark or black coating. In so doing, the rate of radiant heat absorption is increased by a factor of about two in accordance with the classic "black body" radiation theory. Application of the dark coating to the scrap can be achieved by a variety of techniques including dipping the scrap in waste oil or in an aqueous suspension containing carbon such as lampblack. During the preliminary heating of the scrap coated with the waste oil, thermal decomposition of the oil at the elevated temperature effects a deposition of residual carbon on the surfaces of the scrap. Preferably, the black coating is applied to the scrap by means of a reducing-type flame whereby carbon or lampblack is directly deposited on the cold metal surfaces. In this preferred alternative, the deposition of the lampblack coating can be performed in the preheat zone of the furnace arrangement.

By careful control of temperature, scrap surface condition and direction of radiant heat, extremely rapid heating of the scrap through the critical temperature range above the melting point of the aluminum alloy can be effected. Radiant heat transfer to an ideal black body increases directly as a function of the fourth power of the absolute temperature differential between the radiator and the receiver. Accordingly, raising the temperature of the radiator from 1800° F. to 2000° F. results in a 40% increase in the rate of heat transfer to a body at room temperature. By raising the temperature of the radiator to 2600° F. the rate of heat transfer to a room temperature body is increased by 233%. Additionally, by applying the black coating to the scrap, a reduction in time of more than one-half that required to heat non-darkened scrap is effected. Furthermore, by radiating the scrap from both sides effects a further reduction of about one-sixth in the time required to effect a heating of the scrap. Irradiation from both sides further assures rapid heating and obviates the necessity of orienting each piece of scrap in appropriate position during its travel through the furnace.

It will be clear that by a careful control of the aforementioned variables, optimum heating of the scrap through the critical temperature range can be effected in a minimum of time substantially avoiding the formation of any significant amounts of detrimental contaminating aluminum-iron intermetallic compounds.

While it will be apparent that the invention herein described is well calculated to achieve the benefits and advantages set forth above, it will be appreciated that the invention is susceptible to modification, variation and change without departing from the spirit thereof.

What is claimed is:

1. A method for processing bimetallic scrap to separate and recover the aluminum lining from the ferrous substrate without incurring appreciable formation of contaminating iron-aluminum intermetallic compounds comprising the steps of introducing the bimetallic scrap into a furnace chamber, rapidly heating said scrap through a critical temperature range commencing at about 842° F. to a temperature above the melting point of the aluminum lining to convert said lining to the liquid state, removing the liquid aluminum as it is formed from the surface of the ferrous substrate to minimize reaction between the aluminum and iron to avoid any significant formation of iron-aluminum intermetallic compounds and separately recovering the aluminum and ferrous constituents.

2. The method as defined in claim 1 including the further step of preheating the bimetallic scrap to a temperature below about 842° F. before the step of rapidly heating the scrap through said critical temperature range.

3. The method as defined in claim 1 including the further step of pretreating the bimetallic scrap prior to heating to apply a dark surface coating thereon.

4. The method as defined in claim 1 in which the step of rapidly heating the scrap is performed by subjecting the scrap to high intensity radiant heat.

5. The method as defined in claim 1 in which the step of removing the liquid aluminum from the surface of the scrap is achieved by gravitational drainage.

6. The method as defined in claim 5 including the further step of vibrating the scrap to facilitate drainage of the liquid aluminum.

7. The method as defined in claim 1 including the further step of pretreating the bimetallic scrap prior to heating to apply a dark carbonaceous coating thereon.

8. The method as defined in claim 1 in which the step of rapidly heating said scrap through said critical temperature range is performed by subjecting said scrap to intense radiant heat to effect melting of the aluminum lining at a rate of at least about 0.002 inch thickness per second.

9. The method as defined in claim 1 in which the step of rapidly heating said scrap through said critical temperature range is performed employing radiant heating means at a temperature above 2250° F.

10. The method as defined in claim 9 in which said radiant heating means is at a temperature of about 2250° F. to above 2600° F.

* * * * *